(12) United States Patent
Simolon et al.

(10) Patent No.: US 9,762,823 B2
(45) Date of Patent: Sep. 12, 2017

(54) IMAGER WITH INCREASED READOUT CAPACITANCE

(71) Applicant: FLIR Systems, Inc., Wilsonville, OR (US)

(72) Inventors: Brian Simolon, Santa Barbara, CA (US); Eric A. Kurth, Santa Barbara, CA (US)

(73) Assignee: FLIR SYSTEMS, INC., Wilsonville, OR (US)

( * ) Notice: Subject to any disclaimer, the term of this patent is extended or adjusted under 35 U.S.C. 154(b) by 38 days.

(21) Appl. No.: 14/543,774

(22) Filed: Nov. 17, 2014

(65) Prior Publication Data

US 2015/0138367 A1 May 21, 2015

Related U.S. Application Data

(60) Provisional application No. 61/905,757, filed on Nov. 18, 2013.

(51) Int. Cl.
| | |
|---|---|
| *H04N 5/374* | (2011.01) |
| *H04N 5/355* | (2011.01) |
| *H04N 5/378* | (2011.01) |
| *H04N 5/3745* | (2011.01) |
| H04N 5/361 | (2011.01) |

(52) U.S. Cl.
CPC ......... *H04N 5/3559* (2013.01); *H04N 5/378* (2013.01); *H04N 5/37452* (2013.01); *H04N 5/37457* (2013.01); H04N 5/361 (2013.01)

(58) Field of Classification Search
CPC ............ H04N 5/3559; H04N 5/37457; H04N 5/37452

USPC ...................... 348/303, 304, E3.023, E3.019
See application file for complete search history.

(56) References Cited

U.S. PATENT DOCUMENTS

| | | | |
|---|---|---|---|
| 4,314,275 A | * 2/1982 | Chapman | H04N 3/1525 250/332 |
| 4,779,004 A | 10/1988 | Tew et al. | |
| 6,885,002 B1 | 4/2005 | Finch et al. | |
| | | (Continued) | |

OTHER PUBLICATIONS

Dang et al., "Advanced On-FPA Signal Processing for Staring IRFPAs", Paper, Dec. 26, 2001, 11 pages, Wave Optics and VLSI Photonic Devices for Information Processing SPIE vol. 4435, SPIE Publications, http://spie.org/publications/contact-spie-publications.

*Primary Examiner* — Hung Lam
(74) *Attorney, Agent, or Firm* — Haynes and Boone, LLP

(57) ABSTRACT

An image sensor may be provided. The image sensor may be a high-capacitance image sensor or a dual-mode image sensor having a high-capacitance operational mode. A high-capacitance image sensor may include image detectors and associated unit cells. During operation, the image sensor may integrate image signals from each detector row using unit cells in multiple unit cell rows. The image sensor may integrate and readout image signals in an interleaved process that allows each detector row to capture image data using multiple unit cells. A dual-mode image sensor may operate in a similar manner to a high-capacitance image sensor when operated in the high-capacitance mode. The dual-mode image sensor may have switches interposed between unit cells to selectively couple and decouple the unit cells for switching between the high-capacitance mode and a normal operational mode.

20 Claims, 13 Drawing Sheets

(56) References Cited

U.S. PATENT DOCUMENTS

| | | | |
|---|---|---|---|
| 8,629,926 B2* | 1/2014 | Wang | G06K 7/10 |
| | | | 235/472.01 |
| 2005/0057389 A1* | 3/2005 | Krymski | H03K 4/026 |
| | | | 341/169 |
| 2005/0259167 A1* | 11/2005 | Inoue | H04N 5/343 |
| | | | 348/300 |
| 2006/0103749 A1* | 5/2006 | He | H04N 5/2355 |
| | | | 348/308 |
| 2008/0315261 A1* | 12/2008 | McKee | H01L 27/14603 |
| | | | 257/225 |
| 2011/0073923 A1* | 3/2011 | Tatani | H01L 27/14603 |
| | | | 257/291 |
| 2012/0235021 A1* | 9/2012 | Kasai | H04N 5/35527 |
| | | | 250/208.1 |
| 2013/0147997 A1* | 6/2013 | Naganokawa | H01L 27/148 |
| | | | 348/302 |
| 2015/0341582 A1* | 11/2015 | Sakaguchi | H01L 27/14634 |
| | | | 348/301 |

* cited by examiner

IMAGER WITH INCREASED READOUT CAPACITANCE

CROSS-REFERENCE TO RELATED APPLICATION

This application claims priority to and the benefit of U.S. Provisional Patent Application No. 61/905,757 filed Nov. 18, 2013 and entitled "IMAGER WITH INCREASED READOUT CAPACITANCE" which is hereby incorporated by reference in its entirety.

TECHNICAL FIELD

One or more embodiments of the invention relate generally to imaging devices, and more particularly, for example, to infrared imaging sensors with increased charge storage capabilities.

BACKGROUND

There are a wide variety of image detectors, such as visible image detectors, infrared image detectors, or other types of image detectors that may be provided in an image detector array for capturing an image. As an example, a plurality of photodiodes may be provided in an image detector array, to detect electromagnetic radiation at desired wavelengths. Such detectors may be connected to or part of unit cells in a read out integrated circuit (ROIC) which capture image data in response to the detected radiation and then communicate that image data to external electronics. The combination of a detector array with an ROIC is known either as a focal plane array (FPA) or an image sensor.

Each ROIC unit cell commonly includes one or more regions for storing electric charges generated by an associated detector. As image detector arrays trend toward including more and more detectors in a given area, the area of each unit cell is correspondingly decreased. This decrease in unit cell area leads to a decrease in the total capacitance available for charge storage for each image detector. This decrease in capacitance can be problematic, particularly in detector technologies that have relatively large dark currents. Accordingly, there is a need in the art for improved ROIC architectures to provide increased charge storage capabilities.

SUMMARY

A system may be provided for capturing images such as infrared images. The system may include an array of image detectors and associated readout circuitry for reading out image signals from the image detectors.

The image detectors and supporting ROIC unit cells may be arranged in rows and columns. Each ROIC row may be coupled to one or more common control lines that provide control signals such as row-select signals, reset signals, switching signals, and other row control signals. Each column may be coupled to a column readout line along which image signals generated by each detector and captured in the unit cells can be readout.

Each image detector may be coupled to readout circuitry within the unit cell for that detector. The image detector may be formed within the unit cell (e.g., on a common substrate with the unit cell readout circuitry) or may be formed separately from the unit cell readout circuitry (e.g., on a separate substrate from a substrate on which the unit cell readout circuitry is formed).

The unit cell for each detector may include a charge storage region for that detector. The charge storage region for each detector may also be switchably coupled to one or more additional unit cells such as unit cells in one or more adjacent rows.

Image data may be gathered by integrating charges generated by a first detector onto the charge storage regions associated with multiple unit cells, reading out the integrated charges from those charge storage regions to generate a first image signal from the first detector, integrating additional charges from a second detector onto the same charge storage regions, and reading out the additional charges to generate a second image signal from the second detector. In this way, the charge storage capability (i.e., the capacitance) of each detector unit cell can be increased by sharing the charge storage capacities of multiple unit cells.

Image signals may be read out in an interleaved readout process so that image signals from detectors in, for example, odd-numbered detector rows and even-numbered detector rows can be alternately generated and read out from common charge storage regions.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

DETAILED DESCRIPTION

An imaging system is disclosed having an image sensor with an array of image detector elements arranged in detector rows and detector columns. Each detector element may have an associated charge storage region. The image sensor may be configured to be able to store an increased amount of charge generated by each detector element during image capture operations in comparison with conventional cameras for one or more embodiments. The image sensor for an embodiment may be configured to store charges generated by each detector element on charge storage regions associated with that detector element and additional detector elements. In this fashion, the image sensor may be configured to be a high-capacitance image sensor. The image sensor may be configured to be a high-capacitance image sensor, or may be configured to be a dual-mode image sensor having a normal mode and a high-capacitance mode of operation. A user may be provided with the option for an embodiment to switch a dual-mode image sensor between the normal operating mode and the high-capacitance operating mode.

Image data from a high-capacitance image sensor and/or a dual-mode image sensor operating in a high-capacitance mode for one or more embodiments may be read out from the detector elements (image detectors) in an interleaved readout process. In an interleaved readout process, a first set of detector rows may be read out during a first image frame capture and a second set of detector rows that is interleaved with the first set of detector rows may be read out during a second, subsequent image frame capture. Interleaved image frames may then be combined to form a full image.

In one suitable embodiment configuration that is sometimes discussed herein as an example, an image sensor may store charges generated by detector elements in a first detector row on charge storage regions in a corresponding row of charge storage regions and on charge storage regions in an adjacent row of charge storage regions. The image sensor may then store charges generated by detector elements in a second detector row on the charge storage regions in the same two adjacent rows of charge storage regions. In this configuration, the interleaved readout process may include reading out image signals from odd rows of detector elements and then reading out image signals from even rows of detector elements.

Figure 1:
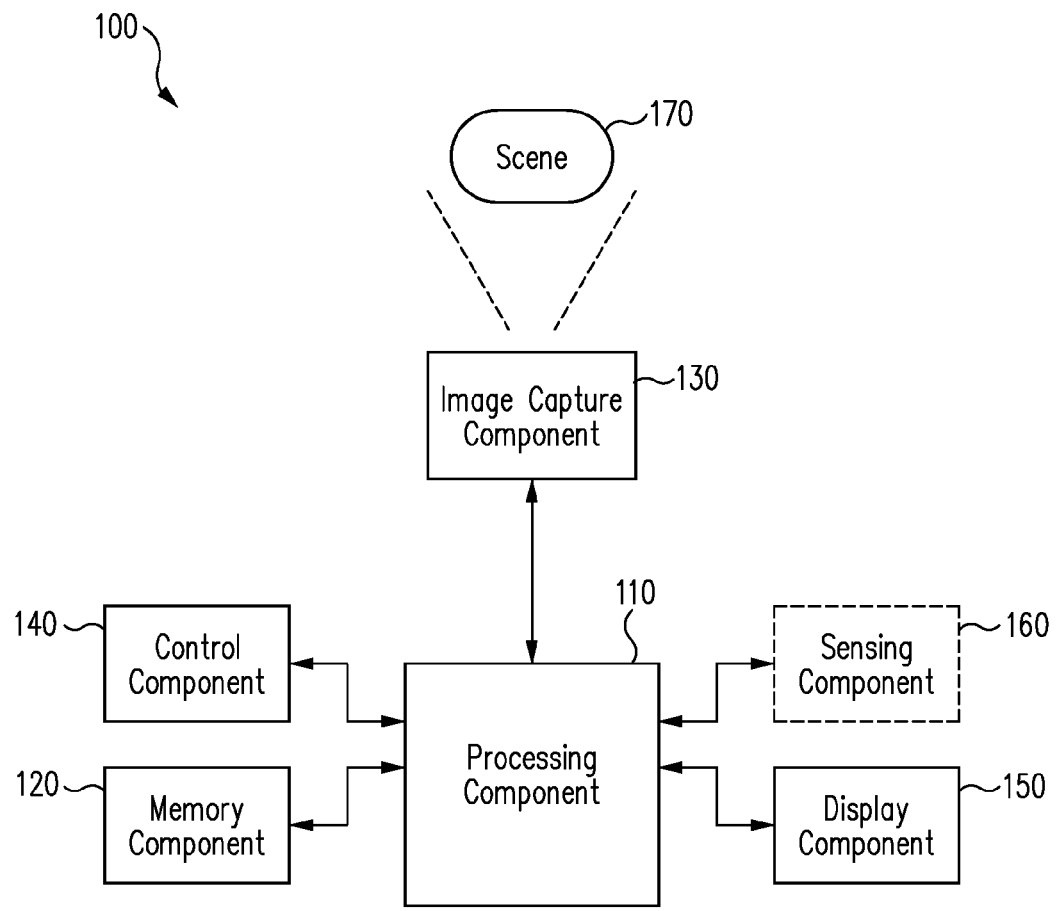
FIG. 1 illustrates an example imaging system in accordance with an embodiment of the disclosure.

Turning now to the drawings, FIG. 1 illustrates a block diagram of a system (e.g., an imaging system such as an infrared camera) for capturing and processing images in accordance with one or more embodiments. System 100 comprises, in one implementation, a processing component 110, a memory component 120, an image capture component 130, a control component 140, and/or a display component 150. System 100 may further include a sensing component 160.

System 100 may represent, for example, an imaging system such as a visible light imaging device, an infrared imaging device, or a multi-band imaging device for capturing and processing images, such as video images of a scene 170. In some embodiments, system 100 may represent any type of infrared camera adapted to detect infrared radiation and provide representative data and information (e.g., infrared image data of a scene) or may represent more generally any type of electro-optical sensor system. As examples, system 100 may represent an infrared camera, a dual band imager such as a night vision imager that operates to sense reflected visible and/or short-wave infrared (SWIR) light for high resolution images and long-wave infrared (LWIR) radiation for thermal imaging, or an imager for sensing both short wave and long wave radiation simultaneously for providing independent image information. System 100 may comprise a portable device and may be incorporated, e.g., into a vehicle (e.g., hand-held devices, an automobile or other type of land-based vehicle, an aircraft, a marine craft, or a spacecraft) or a non-mobile installation requiring infrared images to be stored and/or displayed or may comprise a distributed networked system.

In various embodiments, processing component 110 may comprise any type of a processor or a logic device (e.g., a programmable logic device (PLD) configured to perform processing functions). Processing component 110 may be adapted to interface and communicate with components 120, 130, 140, and 150 to perform method and processing steps and/or operations, as described herein such as controlling biasing and other functions (e.g., values for elements such as variable resistors and current sources, switch settings for timing such as for switched capacitor filters, ramp voltage values, etc.) along with conventional system processing functions as would be understood by one skilled in the art.

Memory component 120 comprises, in one embodiment, one or more memory devices adapted to store data and information, including for example infrared data and information. Memory device 120 may comprise one or more various types of memory devices including volatile and non-volatile memory devices. Processing component 110 may be adapted to execute software stored in memory component 120 so as to perform method and process steps and/or operations described herein.

Image capture component 130 comprises, in one embodiment, any type of image sensor, such as, for example, an image sensor having one or more image detector elements such as infrared photodetector elements (e.g., any type of multi-pixel infrared detector, such as a focal plane array as described hereinafter) for capturing infrared image data (e.g., still image data and/or video data) representative of an scene such as scene 170. In one example, image capture component 130 may include an array of strained layer superlattice (SLS) detectors. However, this is merely illustrative. If desired, image capture component 130 may include one or more arrays of other detector elements such as uncooled detector elements (e.g., uncooled microbolometer sensors), cooled detector elements (e.g., detector elements such as photovoltaic or quantum structure elements that are cooled using a cryogen coupled to the array or using a refrigeration system), InSb detector elements, quantum structure detector elements, InGaAs detector elements, or other types of sensors.

In one implementation, image capture component 130 may be configured to generate digital image data representing incoming image light from scene 170. Image capture component 130 may include one or more signal processing components such as analog-to-digital converters included as part of an infrared sensor or separate from the infrared sensor as part of system 100. In one aspect, infrared image data (e.g., infrared video data) may comprise non-uniform data (e.g., real image data) of a scene such as scene 170. Processing component 110 may be adapted to process the infrared image data (e.g., to provide processed image data), store the infrared image data in memory component 120, and/or retrieve stored infrared image data from memory component 120. For example, processing component 110 may be adapted to process infrared image data stored in memory component 120 to provide processed image data and information (e.g., captured and/or processed infrared image data).

Control component 140 comprises, in one embodiment, a user input and/or interface device. For example, the user input and/or interface device may represent a rotatable knob (e.g., potentiometer), push buttons, slide bar, keyboard, etc., that is adapted to generate a user input control signal. Processing component 110 may be adapted to sense control input signals from a user via control component 140 and respond to any sensed control input signals received therefrom. Processing component 110 may be adapted to interpret such a control input signal as a parameter value, as generally understood by one skilled in the art.

In one embodiment, control component 140 may comprise a control unit (e.g., a wired or wireless handheld control unit) having push buttons adapted to interface with a user and receive user input control values. In one implementation, the push buttons of the control unit may be used to control various functions of the system 100, such as autofocus, menu enable and selection, field of view, brightness, contrast, noise filtering, high pass filtering, low pass filtering, and/or various other features as understood by one skilled in the art.

In one embodiment, control component 140 may optionally include temperature control components for cooling or heating an image sensor. Temperature control components may include a container such as a Dewar containing a cryogenic liquid and a thermally conductive coupling member coupled between the cryogenic liquid and a sensor structure on which an array of detectors is formed. However, this is merely illustrative. If desired, image capture component 130 may be an uncooled image capture component.

Display component 150 comprises, in one embodiment, an image display device (e.g., a liquid crystal display (LCD) or various other types of generally known video displays or monitors). Processing component 110 may be adapted to display image data and information on the display component 150. Processing component 110 may be adapted to retrieve image data and information from memory component 120 and display any retrieved image data and information on display component 150. Display component 150 may comprise display electronics, which may be utilized by processing component 110 to display image data and information (e.g., infrared images). Display component 150 may be adapted to receive image data and information directly from image capture component 130 via the processing component 110, or the image data and information may be transferred from memory component 120 via processing component 110.

Sensing component 160 comprises, in one embodiment, one or more sensors of various types, depending on the application or implementation requirements, as would be understood by one skilled in the art. The sensors of optional sensing component 160 provide data and/or information to at least processing component 110. In one aspect, processing component 110 may be adapted to communicate with sensing component 160 (e.g., by receiving sensor information from sensing component 160) and with image capture component 130 (e.g., by receiving data and information from image capture component 130 and providing and/or receiving command, control, and/or other information to and/or from one or more other components of system 100).

In various implementations, sensing component 160 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder), and/or whether a tunnel or other type of enclosure has been entered or exited. Sensing component 160 may represent conventional sensors as generally known by one skilled in the art for monitoring various conditions (e.g., environmental conditions) that may have an effect (e.g., on the image appearance) on the data provided by image capture component 130.

In some implementations, optional sensing component 160 (e.g., one or more of sensors) may comprise devices that relay information to processing component 110 via wired and/or wireless communication. For example, optional sensing component 160 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques.

In various embodiments, components of system 100 may be combined and/or implemented or not, as desired or depending on the application or requirements, with system 100 representing various functional blocks of a related system. In one example, processing component 110 may be combined with memory component 120, image capture component 130, display component 150, and/or optional sensing component 160. In another example, processing component 110 may be combined with image capture component 130 with only certain functions of processing component 110 performed by circuitry (e.g., a processor, a microprocessor, a logic device, a microcontroller, etc.) within image capture component 130. Furthermore, various components of system 100 may be remote from each other (e.g., image capture component 130 may comprise a remote sensor with processing component 110, etc. representing a computer that may or may not be in communication with image capture component 130).

Figure 2:
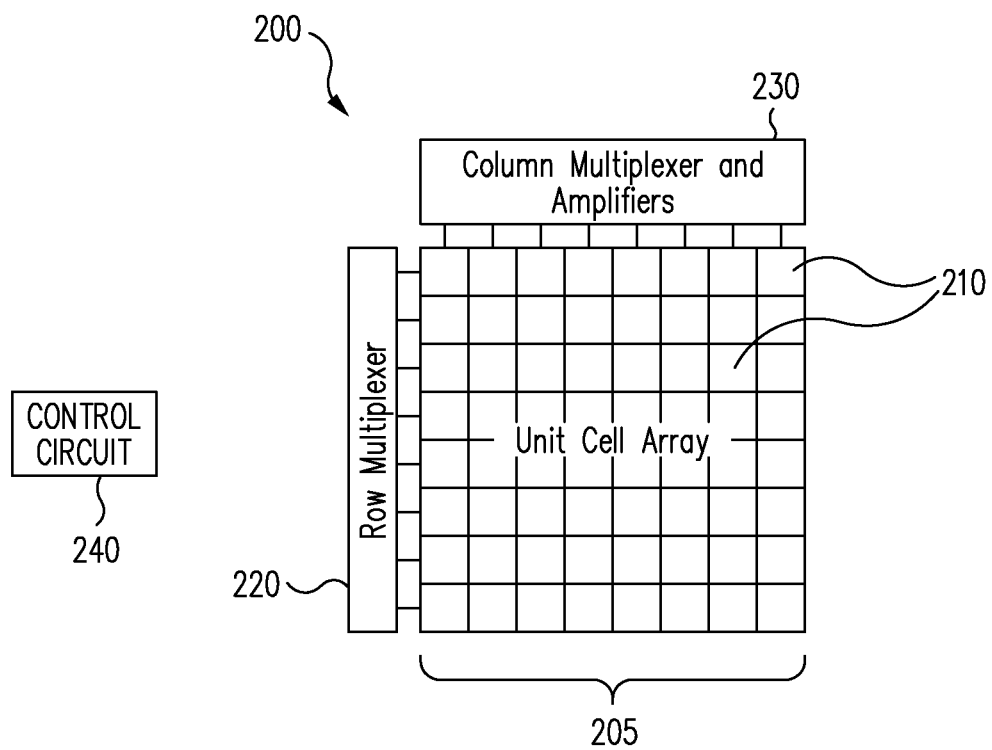
FIG. 2 illustrates a block diagram of a focal plane array in accordance with an embodiment of the disclosure.

FIG. 2 is a block diagram of a focal plane array (FPA) 200 in accordance with an embodiment of the invention. FPA 200 may, for example, be implemented as an image sensor in image capture component 130 of FIG. 1.

As shown in FIG. 2, FPA 200 may include an array 205 of unit cells 210 (e.g., an array of 1280×720 unit cells or any other desired number of unit cells with each unit cell sized to be 10 μm×10 μm or any other desired size). Each unit cell 210 may be associated with a detector (e.g., a photodetector or photosite) and associated sampling and readout circuitry. In this regard, FPA 200 may be used to capture image data from the detectors in one or more image frames. For example, such image data may be infrared image data of a target scene such as scene 170. FPA 200 may also include a row multiplexer 220 and a column multiplexer 230 (e.g., also including associated amplifiers) for selecting various rows and columns of array 205 and for reading data therefrom.

Detectors for generating image signals to be integrated and read out by unit cells 210 may be arranged in detector rows and detector columns that correspond to the rows and columns of unit cells 210. For example, in one embodiment, each unit cell 210 may have an associated detector formed on a common substrate with the unit cell, formed over the unit cell on an additional substrate, or otherwise formed adjacent to that unit cell.

The detectors may provide detector signals (e.g., charge, current, voltage, or other signal forms) to unit cells 210 in response to light (e.g., infrared light or other light) received by the detector during an integration period. In one embodiment, each unit cell 210 may be selectively operated to perform an integration at a node (e.g., to integrate charges such as electrons or holes) in response to current generated by a detector in response to incoming light that is incident on the detector during an integration period. A voltage corresponding to the charge at the integration node may be captured by sample and hold (S/H) circuitry of the unit cell 210 and read out from the unit cell 210 by using row multiplexer 220 and column multiplexer 230.

In some embodiments, each unit cell 210 may be configured to integrate and readout image signals generated by detectors in multiple detector rows. In this type of configuration, a single unit cell 210 may be used to integrate charges, during multiple integration times, from multiple detectors, including detectors associated with other unit cells 210. For example, a unit cell 210 in a first row may be used to integrate image charges from its associated detector and from one or more detectors in adjacent detector rows. In this way, the capacitance of multiple unit cells 210 may be combined to allow high-capacitance integration of charges for imaging with FPA 200.

One or more control circuits 240 may be provided as part of and/or separate from FPA 200 to provide various signals further described herein. Such control circuits 240 may be implemented in accordance with any appropriate control circuits such as one or more processors, logic, clocks, and/or other circuits as may be desired for particular implementations.

Figure 3:
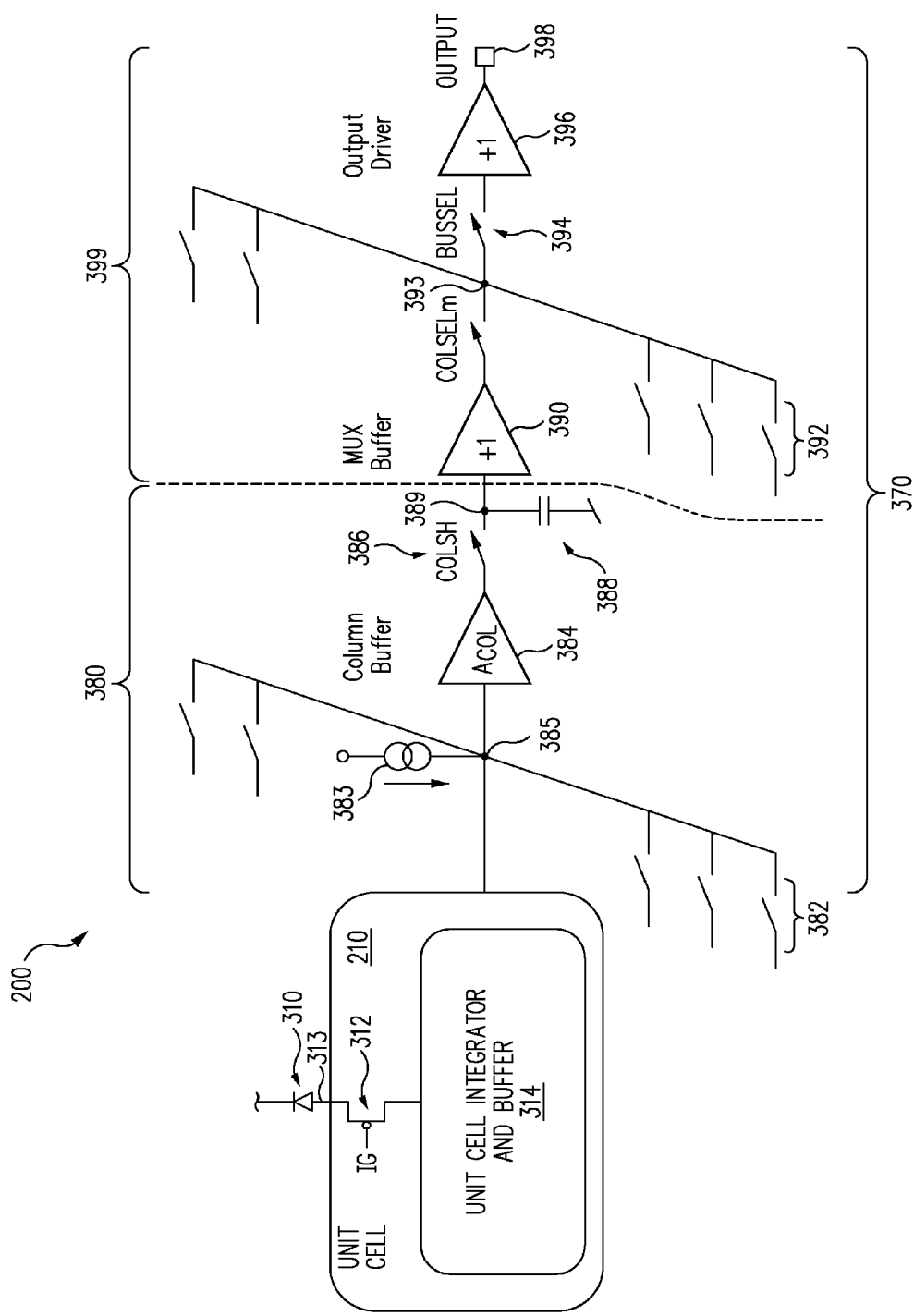
FIG. 3 illustrates a block diagram of a detector, a unit cell, and read out circuitry of the focal plane array of FIG. 2 in accordance with an embodiment of the disclosure.

FIG. 3 is a block diagram of a unit cell buffer such as unit cell 210, an associated image detector such as photodetector 310, and column read out circuitry 399 of FPA 200 of FIG. 2 in accordance with an embodiment of the invention.

Detector 310 may be implemented with, for example a photodiode as shown in FIG. 3. In one embodiment, detector 310 may be implemented as an infrared photodetector such as a strained layer superlattice detector. Other implementations of detector 310 are also contemplated. In various embodiments, detector 310 may be implemented with one or more avalanche photodiodes or PIN diodes (e.g., each diode having an intrinsic region between a p-type region and an n-type region), or other suitable photodetector circuitry. For example, in one embodiment, such PIN diodes may be implemented as reverse-biased indium gallium arsenide (InGaAs) PIN photodiodes. Detector 310 and unit cell buffer 210 may be cooled or uncooled.

Detector 310 may be connected to unit cell 210 over a communications path such as path 313. Communications path 313 may interface to one or more gate structures such as a direct injection (DI) input gate 312. Input gate 312 may be operable to control the transmission of image signals from detector 310 to unit cell integrator and buffer 314 using an input gate control signal IG. Path 313 may, in some embodiments, include one or more indium bumps (e.g., also referred to as a connection node). In this regard, detector 310 may be separately fabricated from unit cell 210 and subsequently joined to unit cell 210 by a connection node formed from, for example, indium bumps.

In a high-capacitance mode of operation, unit cell 210 may be configured to store and readout image signals from detector 310 and from additional detectors associated with other unit cells 210 at various times. Detector 310 may provide image signals to unit cell 210 and to additional unit cells 210 associated with other detectors 310 in order to increase the available charge storage capacity available for integrating image signals with detector 310.

As discussed, unit cell 210 may be part of array 205 of unit cells 210 in FPA 200 that is arranged in various rows and columns. Column readout circuitry 380 may be implemented, for example, as part of the read out integrated circuit (ROIC) of FPA 200 to provide output signals from array 205. In this regard, additional row-select switches 382 (e.g., row-select switches of unit cells 210 of other rows of array 205) may also be coupled to column read out circuitry 380. Column readout circuitry 380 may include a current source 383 which may be used to bias a node 385 (e.g., also referred to as a column output node).

Column readout circuitry 380 also includes a buffer 384 (e.g., also referred to as a column buffer), a switch 386 (e.g., for passing a voltage held by node 385 to be sampled at a node 389), a capacitor 388 (e.g. for holding sampled voltages at node 389). In order to multiplex signals from all columns to an output driver, multiplexing circuitry 399 may also be included. Multiplexing circuitry 399 may include a buffer 390, column select switches 392, a node 393 (e.g., also referred to as an output bus node), a bus select switch 394, an output driver 396, and a node 398 (e.g., also referred to as an FPA output node). In one embodiment, the output signal provided at node 398 may be a voltage signal to conveniently interface with other circuits as may be desired.

In one embodiment, the multiplexing readout circuitry 370 may be implemented as an ROIC to read out sequentially captured images on a frame by frame basis. In some embodiments, readout circuitry 370 is operable to readout interleaved image frames. For example, image signals for a first interleaved image frame may be captured using detectors 310 in a first set of detector rows and read out separately from a second interleaved image frame captured using detectors 310 in another set of detector rows that is interleaved with the first set of detector rows. In this way, image signals from less than all of the detectors can be read out in each frame, thereby allowing the use of multiple unit cells for accumulation of image signals from the detectors to be read out for that frame. Then, the remaining detectors can also use multiple unit cells for accumulation of image signals from those remaining detectors for a subsequent image frame.

FPA 200 may therefore be implemented as a high-capacitance image sensor. In some embodiments, FPA 200 is permanently configured as a high-capacitance image sensor. In other embodiments, FPA 200 may be configured as a dual-mode image sensor that can be switchably operated in a normal mode of operation in which each detector accumulates image signals in single associated unit cell or a high-capacitance mode of operation in which each detector accumulates image signals in multiple unit cells.

Figure 4:
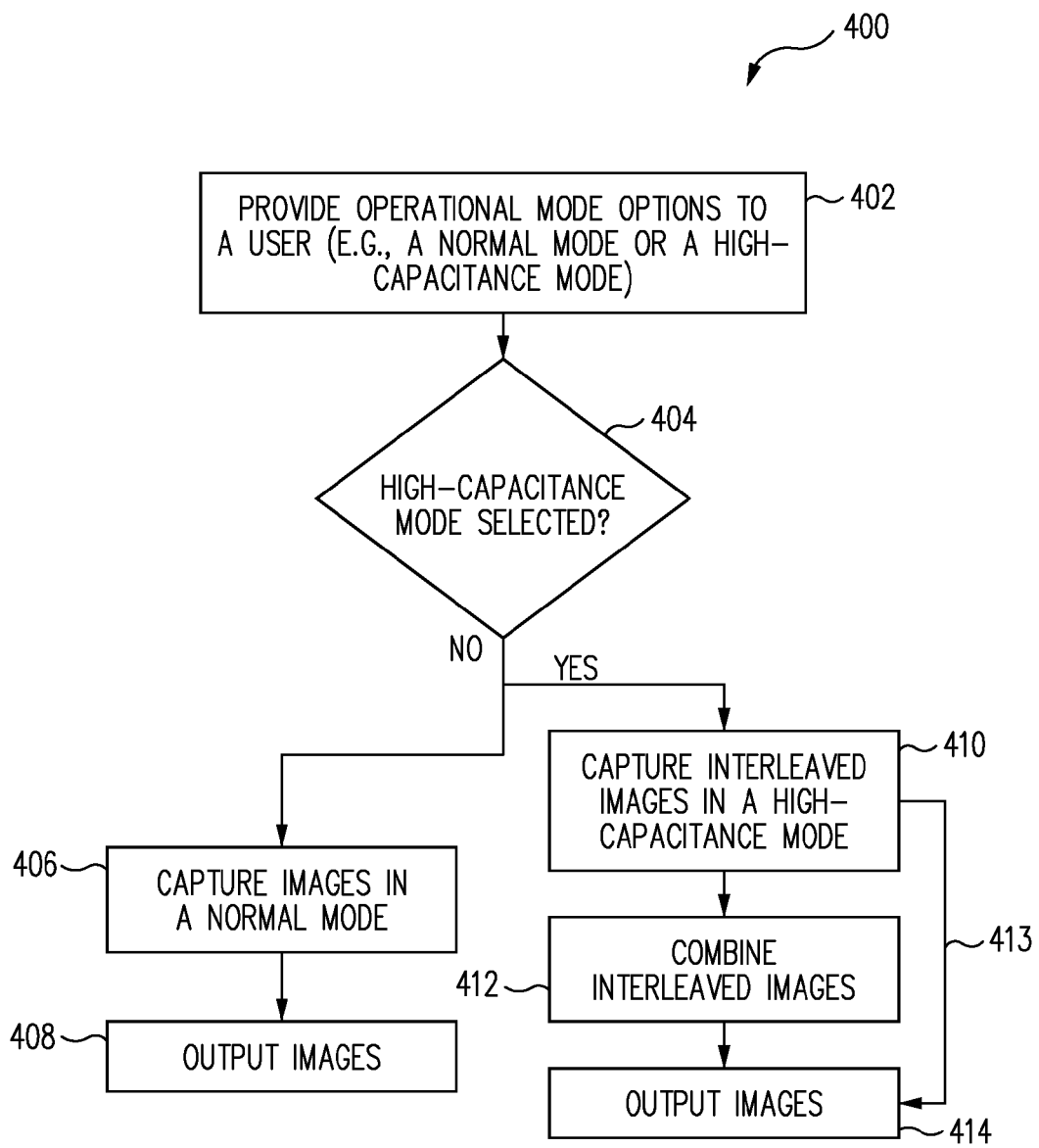
FIG. 4 illustrates a flow diagram showing how an imaging system may be operated using a selectable high-capacitance mode of operation in accordance with an embodiment of the disclosure.
Figure 5:
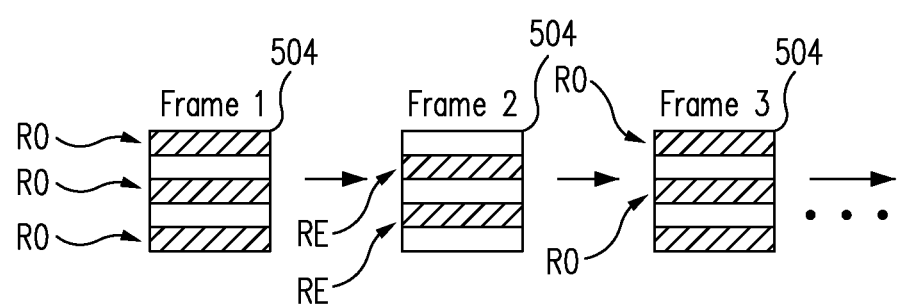
FIG. 5 illustrates a diagram showing how a focal plane array may be read out in an interleaved readout operation in accordance with an embodiment of the disclosure.

Various embodiments of the circuitry of unit cell 210 are described below in connection with FIGS. 6, 9, and 11. The operation of unit cell 210 in various embodiments is described below in connection with FIGS. 7, 8, 10, 12, and 13. FIG. 4 is a flow diagram showing how, in some embodiments, an image sensor such as FPA 200 having a dual-mode image sensor configuration may be switched between a normal mode of operation and a high-capacitance mode of operation. FIG. 5 is a diagram showing how an image sensor may capture interleaved image frames.

Turning now to FIG. 4, FIG. 4 illustrates a flowchart of a process 400 to generate images using a dual-mode image sensor having a selectable high-capacitance mode of operation in accordance with an embodiment of the disclosure.

It should also be appreciated that any step, sub-step, sub-process, or block of process 400 may be performed in an order or arrangement different from the embodiment illustrated by FIG. 4. In some embodiments, any portion of process 400 may be implemented in a loop so as to continuously capturing and process a series of images, such as a video of a scene. In other embodiments, process 400 may be implemented in a partial feedback loop including display of intermediary processing (e.g., after or while receiving images, performing preprocessing operations, generating combined images, performing post processing operations, or performing other processing of process 400) to a user, for example, and/or including receiving user input, such as user input directed to any intermediary processing step.

At block 402, a user of an imaging system such as imaging system 100 having selectable modes of operation may be provided with operational mode options (e.g., an option to operate the imaging system in a normal mode of operation or an option to operate the imaging system in a high-capacitance mode of operation). For example, the user may be provided with a physical switch, button, or other mechanical mechanism for mode switching or the user may be provided with text or image based options using a display component such as display component 150 of FIG. 1. However, this is merely illustrative. In some embodiments, a system such as system 100 may be configured to automatically switch between the normal mode of operation and the high-capacitance mode of operation based on, for example, detection of saturation conditions in the image capture component.

At block 404, it may be determined (e.g., by a processor such as processing component 110) whether a high-capacitance mode has been selected.

In response to determining that a high-capacitance mode has not been selected, the imaging system may proceed to block 406. At block 406, images may be captured in a normal mode of operation. Capturing images in a normal mode of operation may include integrating charges from each image detector using the charge storage region in the single unit cell associated with that detector.

At block 408, images captured at block 406 may be output (e.g., to a display, to memory, or to external computing equipment).

In response to determining that a high-capacitance mode has been selected, the imaging system may proceed to block 410. At block 410, images may be captured in a high-capacitance mode of operation. Capturing images in a high-capacitance mode of operation may include capturing interleaved images in which alternating interleaved image frames each include image data generated by detectors in alternating interleaved sets of detector rows. The image data generated by the detectors in each detector row may be integrated using charge storage regions in unit cells in multiple unit cell rows.

In one suitable process that is sometimes discussed herein as an example, detectors in odd-numbered detector rows may be used to generate image data for a first interleaved image frame and detectors in even-numbered detector rows may be used to generate image data for a subsequent second interleaved image frame as shown in FIG. 5. The detectors in the odd-numbered detector rows may integrate image signals RO for a first interleaved image frame 500 using charge storage regions in odd-numbered and even numbered unit cell rows. The detectors in the even-numbered detector rows may also integrate image signals RE for a second interleaved image frame 502 using charge storage regions in odd-numbered and even-numbered unit cell rows. As shown in FIG. 5, additional interleaved image frames such as third interleaved image frame 504 with additional interleaved image data such as additional image signals RO may be captured in a continuous stream (e.g., for generating streaming video images).

Referring again to FIG. 4, at block 412, interleaved images may be combined to form an output image. The combined (output) image may include alternating rows of image data from two or more interleaved image frames. In the example described above in which the first and second interleaved image frames are generated by respective odd and even-numbered detector rows, the combined image may include odd-row image data RO from first interleaved image frame 500 in odd-numbered rows of image data values and even-row image data RE from second interleaved image frame 502 in even-numbered rows of image data values. However, this is merely illustrative. If desired, each interleaved image frame may include image data generated from detectors in alternating pairs of detector rows, alternating triplets of detector rows, or other combinations of detectors that each integrate image signals onto charge storage regions of multiple unit cells.

At block 414, the combined images formed at block 412 may be output (e.g., to a display, to memory, or to external computing equipment). However, this is merely illustrative. In some embodiments, captured interleaved images from block 410 may be output directly to an interlaced display at block 414 (as indicated by arrow 413).

Figure 6:
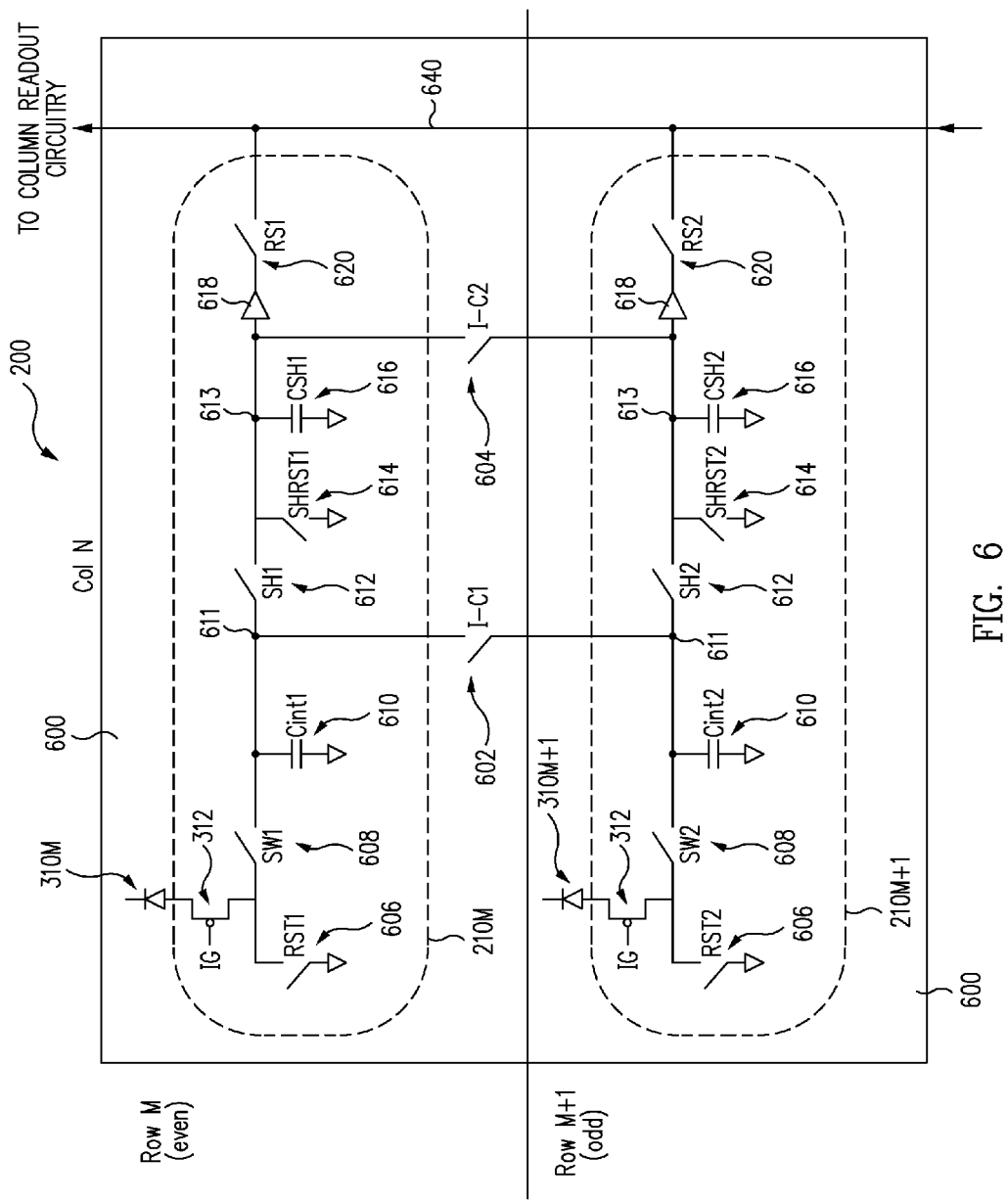
FIG. 6 illustrates a circuit diagram of dual-mode circuitry associated with the unit cell of FIG. 3 in accordance with an embodiment of the disclosure.

FIG. 6 is a circuit diagram showing how, in one embodiment, two unit cells 210 in, for example, FPA 200 in a dual-mode configuration may be switchably coupled together to allow integration of image signals from each detector using multiple unit cells in a high-capacitance mode of operation.

As shown in FIG. 6, in a particular column (e.g., an Nth column or Col N) of imaging pixels 600 (e.g., a circuit containing a detector 310 coupled to a unit cell 210), unit cells 210 in adjacent rows (e.g., an Mth row and an adjacent M+1th row) may be switchably coupled together using increased-capacitance (I-C) switches such as increased-capacitance switches 602 and 604. Each detector 310 may be formed as a portion of its associated unit cell or may be formed separately from its associated unit cell.

In this way, FPA 200 may be configured as a dual-mode image sensor that can be switched between a normal mode of operation and a high-capacitance mode of operation by respectively opening and closing I-C switches 602 and 604, For example, for a normal mode of operation, switches 602 and 604 may be held open with switch 608 closed. For a high-capacitance mode of operation, switch 602 and, if desired, switch 604 may be held closed with switches 606 and 608 set appropriately in each unit cell as described below.

As shown in FIG. 6, each unit cell 210 may include a charge storage region such as a capacitor 610 which may be used to collect charges and thereby store a signal voltage at node 611 during an integration period. Each unit cell 210 may also include a switch 608 coupled between its capacitor 610 and the detector 310 of that cell. Switch 608 of unit cell 210M (in row M) may be operated by a control signal SW1 to couple or decouple detector 310M from the rest of the readout circuitry of unit cell 210M. Similarly, switch 608 of unit cell 210M+1 (in row M+1) may be operated by a control signal SW2 to couple or decouple detector 310M+1 from the rest of the readout circuitry of unit cell 210M+1.

Each unit cell 210 may also include a reset switch 606 for resetting capacitor 610 and/or detector 310 to a reset voltage. Reset switch 606 of unit cell 210M may be operated by a reset control signal RST1 and reset switch 606 of unit cell 210M+1 may be operated by a reset control signal RST2.

Each unit cell 210 may also include a transfer switch 612 which may be used to sample the voltage of node 611. Transfer switch 612 of unit cell 210M may be operated by a transfer control signal SH1 and transfer switch 612 of unit cell 210M+1 may be operated by a transfer control signal SH2. Transfer switch 612 of each unit cell may selectively pass the signal voltage from node 611 to a node 613 (e.g., also referred to as a sampling node or a sample and hold node) where the signal voltage is held by capacitor 616.

Each unit cell 210 may also include a sample-hold-reset switch 614 for providing a reset voltage at node 613. Sample-hold-reset switch 614 of unit cell 210M may be operated by a sample-hold-reset switch control signal SHRST1 and sample-hold-reset switch 614 of unit cell 210M+1 may be operated by a sample-hold-reset switch 614 control signal SHRST2.

In one embodiment, switches of unit cells 210 may be implemented as transistors that are controlled by corresponding control signals that are provided to a gate terminal of the transistor.

Each unit cell 210 may also include a buffer 618 (e.g., which may be implemented, for example, as a transistor providing a source follower) and a row-select switch 620 (e.g., which may be implemented, for example, as a transistor). Each unit cell 210 may pass a sampled voltage (e.g., a signal voltage and/or a reset voltage) held at node 613 through buffer 618 and switch 620 in response to, for example, a row-select signal for that unit cell. Row-select switch 620 of unit cell 210M may be operated by a row-select control signal RS1 and row-select switch 620 of unit cell 210M+1 may be operated by a row-select control signal RS2.

In a normal mode of operation for FPA 200 of FIG. 6, both I-C switches 602 and 604 may held open by holding, for example, holding an increased-capacitance signal for each switch low (e.g., I-C signals I-C1 and IC-2 may be held at a logic low value).

In the normal mode of operation, integration and readout of image signals from each detector 310 may be performed by its own associated unit cell 210 (e.g., image signals generated by detector 310M in row M are integrated and read out using unit cell 210M and image signals generated by detector 310M+1 in row M+1 are read out using unit cell 210M+1).

In a high-capacitance mode of operation, I-C switch 602 may be closed using I-C control signal I-C1 and I-C switch 604 may be closed using I-C control signal I-C2. In this way, the capacitances Cint1 and Cint2 of capacitors 610 in both unit cells 210M and 210M+1 may be combined for storing image signals from one of detectors 310M or 310M+1. The capacitances CSH1 and CSH2 of capacitors 616 in both unit cells 210M and 210M+1 may be also combined for storing image signals from one of detectors 310M or 310M+1.

When integrating image signals from detector 310M using capacitors 610 in both unit cells 210M and 210M+1, I-C switches 602 and 604 may be closed, switch 608 of unit cell 210M may be closed, switch 608 of unit cell 210M+1 may be open, reset switch 606 of unit cell 210M may be open, reset switch 606 of unit cell 210M+1 may be closed and transfer switches 612 in both unit cells 210M and 210M+1 may be open. In this way, image signals generated by detector 310M can be stored on capacitors 610 in both unit cells 210M and 210M+1. When it is desired to read out the image signal from detector 310M that is stored on capacitors 610 in both unit cells 210M and 210M+1, switches 612, 614, and 620 of each unit cell may be operated separately or together to read out the image signal along column line 640. In this way, image signals from detectors in the Mth row may be readout.

Subsequently, image signals from detector 310M+1 may be integrated and read out using capacitors 610 in both unit cells 210M and 210M+1. If desired, other detectors in the M+1th row and other odd-numbered rows may also integrate and readout image signals during integration and readout of detector 310M+1. When integrating image signals from detector 310M+1 using capacitors 610 in both unit cells 210M and 210M+1, I-C switches 602 and 604 may be closed, switch 608 of unit cell 210M may be open, switch 608 of unit cell 210M+1 may be closed, reset switch 606 of unit cell 210M may be closed, reset switch 606 of unit cell 210M+1 may be open, and transfer switches 612 in both unit cells 210M and 210M+1 may be open. In this way, image signals generated by detector 310M+1 can be stored on capacitors 610 in both unit cells 210M and 210M+1. When it is desired to read out the image signal from detector 310M+1 that is stored on capacitors 610 in both unit cells 210M and 210M+1, switches 612, 614, and 620 of each unit cell may be operated separately or together to read out the image signal along column line 640.

Figure 7:
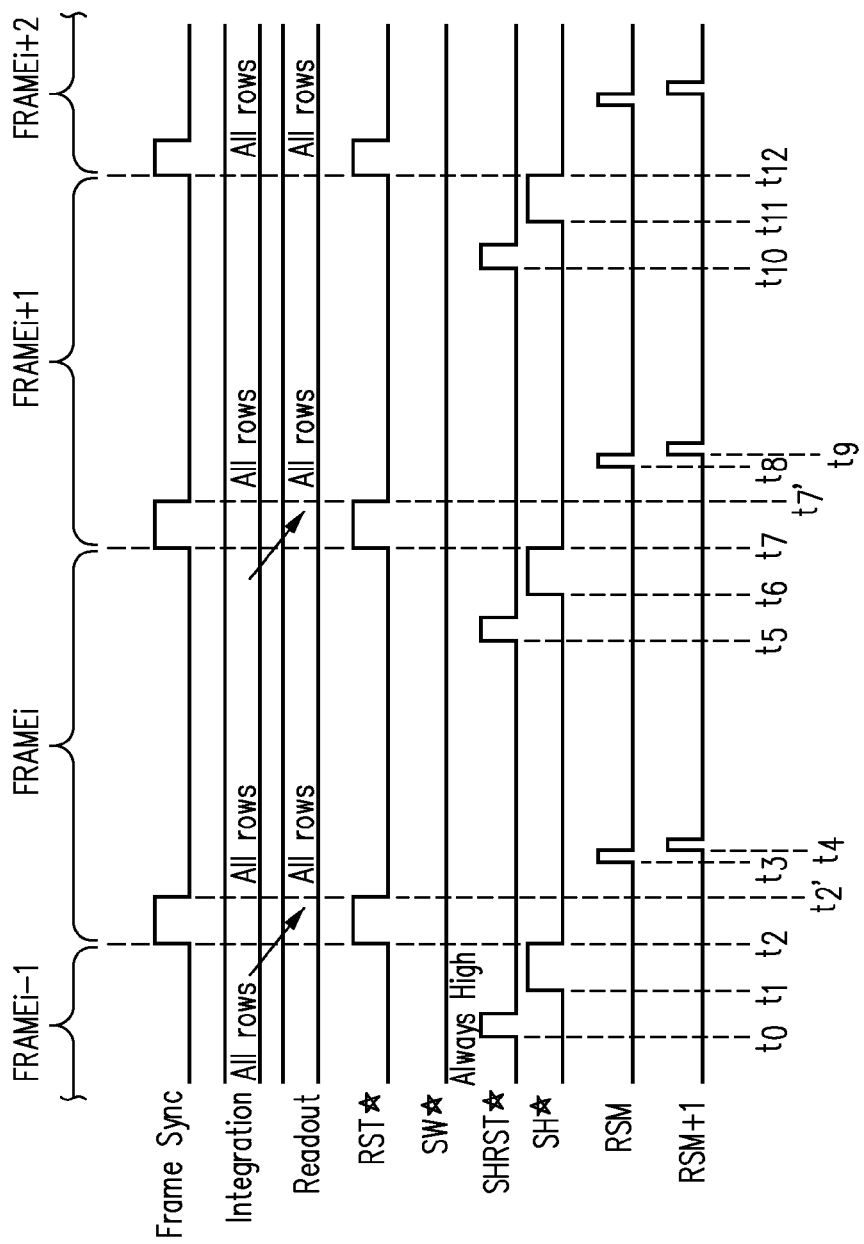
FIG. 7 illustrates a timing diagram showing the status of various control signals during a normal mode of operation for the circuitry of FIG. 6 in accordance with an embodiment of the disclosure.
Figure 8:
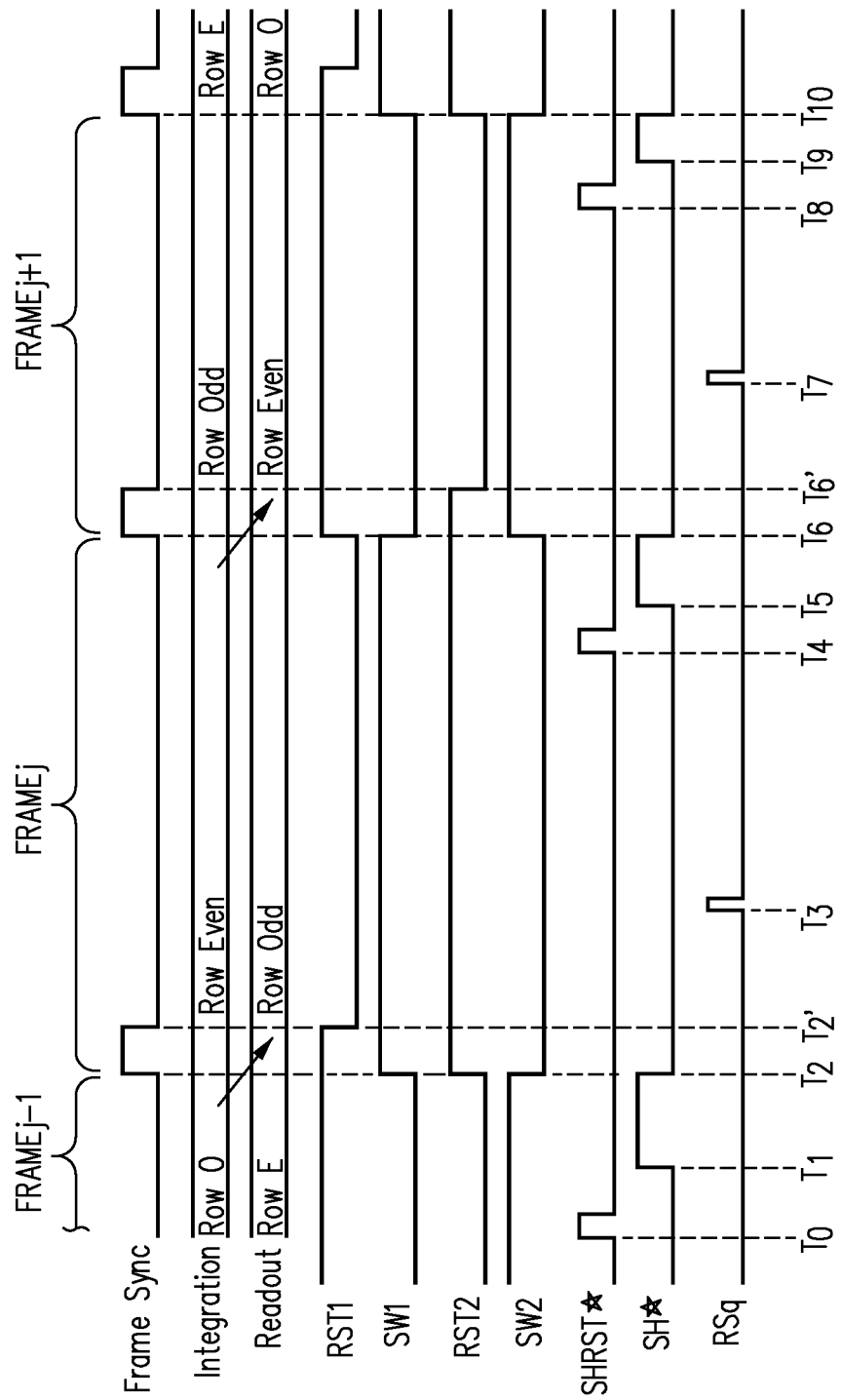
FIG. 8 illustrates a timing diagram showing the status of various control signals during a high-capacitance mode of operation for the circuitry of FIG. 6 in accordance with an embodiment of the disclosure.

The operation of unit cells 210M and 210M+1 may be further understood with reference to FIGS. 7 and 8 which illustrate timing diagrams of unit cells 210M and 210M+1 in respective normal and high-capacitance modes of operation in accordance with embodiments of the invention. In particular, FIG. 7 illustrates the status of various signals during a normal mode of operation performed by unit cells 210.

In FIG. 7, a control signal followed by a * indicates that that control signal is asserted and deasserted in both unit cell 210M and unit cell 210M+1 at the same time as indicated (i.e., RST* indicates RST1 and RST2, SW* indicates SW1 and SW2, SHRST* indicates SHRST1 and SHRST2, and SH* indicates SH1 and SH2).

As shown in FIG. 7, in the normal mode of operation, switch signals SW* are always held high (to close switches 608) and, for each image frame, all rows (e.g., all detector rows) are integrated and read out.

Control signals SHRST* and SH* may be pulsed at respective times t0 and t1 in order to prepare image signals for an i−1th frame for readout. For an ith frame, at a time t2, a frame sync single and a reset signal RST* may be pulsed. The reset signal RST* closes switches 606 in order to reset the capacitors 610. Following the reset, during an integration period (from time t2' through time t7), image signals may be integrated onto capacitors 610 from their associated detectors. During the readout period (t2 to t5), image signal voltages from the previous frame may be read out from unit cell 210M and 210M+1 by pulsing, at times t3 and t4, row-select control signals RSM and RSM+1.

In response to the row-select control signal pulse for each row, all columns in that row are sent from the unit cells of that row to corresponding column buffers. For an array with a number P of physical rows, P row-select control signal pulses are asserted sequentially to read out every physical row for each image frame.

During the integration period, at a time t5, sample-hold-reset signals SHRST* may be pulsed to reset capacitors 616. If desired, a reset voltage may be read out from nodes 613 by pulsing (not shown) the row-select signal for each row.

At the end of the integration period for the ith frame, at a time t6, the transfer control signals SH* may be pulsed to transfer the integrated signal from nodes 611 to nodes 613 to be stored using capacitors 616.

The transferred signals at nodes 613 may then be read out from time t7 through time t10, by pulsing RS* at times t8 and t9. A frame sync signal and a reset pulse may be asserted at time t7 to begin the i+1th frame. Image signals for the i+1th frame may be integrated from time t7' to time t12 and then be transferred to a node 613 that has been reset by pulsing SHRST* and SH* at respective times t10 and t11.

Subsequent frames such as an i+2th frame, may then be captured by repeating the signals used for frames i and i+1 following a frame sync signal and a reset signal at time t12.

FIG. 8 illustrates the operation of various signals during a high-capacitance mode of operation performed by unit cells 210. In the example of FIG. 8, increased-capacitance signals I-C1 and I-C2 (not shown) are held high throughout in order to close switches 602 and 604, thereby changing the operating mode of FPA 200 from a normal mode to a high-capacitance mode.

In FIG. 8, as in FIG. 7, a control signal followed by a * indicates that that control signal is asserted and deasserted in both unit cell 210M and unit cell 210M+1 at the same time as indicated in the figure (i.e., SHRST* indicates SHRST1 and SHRST2, and SH* indicates SH1 and SH12).

As shown in FIG. 8, in the high-capacitance mode of operation using the dual-mode circuitry of FIG. 6, control signals SHRST* and SH* may be pulsed at respective times T0 and T1 in order to prepare image signals from, for example, an odd-numbered detector row (referred to as ROW O or ROW Odd in FIG. 8) for an j−1th frame for readout during integration of a jth frame.

For a jth frame, at a time T2, a frame sync single may be asserted, switch control signal SW1 and reset control signal RST2 may transition to a logic high value, and switch signal SW2 may be deasserted (transition to a logic low value) in order to close switch 608 of cell 210M, open switch 608 of cell 210M+1, and sink current from detector 310M+1 in order to avoid signal leakage from detector 310M+1 during integration of row M.

At time T2, reset control signal RST1 may be still have a logic high value from operations associated with frame j−1. At a time T2', the frame sync signal and reset signal RST1 may be deasserted to begin integration of charge from detector 310M onto capacitors 610 of both unit cells 210M and 210M+1. During an integration time for frame j (from time T2' to time T6), data from the previous frame is readout (from time T2 to time T4) by a row-select signal RSq (i.e., row-select signal RS1, row-select signal RS2, or both row-select signals RS1 and RS2) being pulsed at a time T3 in order to read out an image signal associated with frame j−1 from nodes 613 of both unit cells 210M and 210M+1.

During the integration period for the jth frame, at a time T4, sample-hold-reset signals SHRST* may be pulsed to reset capacitors 616. If desired, a reset voltage may be read out from nodes 613 by pulsing (not shown) the row-select signal for one or both rows.

Near the end of the integration period for the jth frame, at a time T5, the transfer control signals SH* may be pulsed to transfer the integrated signals generated by detector 310M from nodes 611 to nodes 613 to be stored using capacitors 616.

The transferred signals at nodes 613 may then be read out during a subsequent readout time (from time T6 through time T8) for a j+1th frame, by pulsing RSq at a time T7.

The j+1th frame begins when, at time T6, a frame sync single is asserted, switch control signal SW1 is deasserted and reset control signal RST1 and switch signal SW2 are asserted high, in order to open switch 608 of cell 210M, close switch 608 of cell 210M+1, and sink current from detector 310M in order to avoid signal leakage from detector 310M during integration of row M+1. At time T6, reset control signal RST2 is still high from operations associated with frame j. At a time T6', the frame sync signal and reset signal RST2 may be deasserted to begin integration of charge from detector 310M+1 onto capacitors 610 of both unit cells 210M and 210M+1. During the integration time for frame j+1, a row-select signal RSq (i.e., row-select signal RS1, row-select signal RS2, or both row-select signals RS1 and RS2) may be pulsed in order to read out the image signal integrated for frame j from nodes 613 of both unit cells 210M and 210M+1.

Signals for the j+1th frame (e.g., Row Odd signals) may then be transferred to nodes 613 that have been reset by pulsing SHRST* and SH* at respective times T8 and T9.

Subsequent frames, such as an additional even row (Row E or Row EVEN) frame, may then be captured using a repeat of the signals for frames j and j+1 beginning at time T10.

The circuitry shown in FIG. 6 and the corresponding signals described in connection with FIGS. 7 and 8 are merely illustrative. Other configurations of unit cells for accumulating charge from multiple detectors are also contemplated. As examples, unit cell configurations may be provided that allow switching between a normal mode of operation and a high-capacitance mode of operation using only a single switch between two adjacent unit cells or unit cell configurations may be provided that allow only high-capacitance imaging using shared charge storage and interleaved readout.

Figure 9:
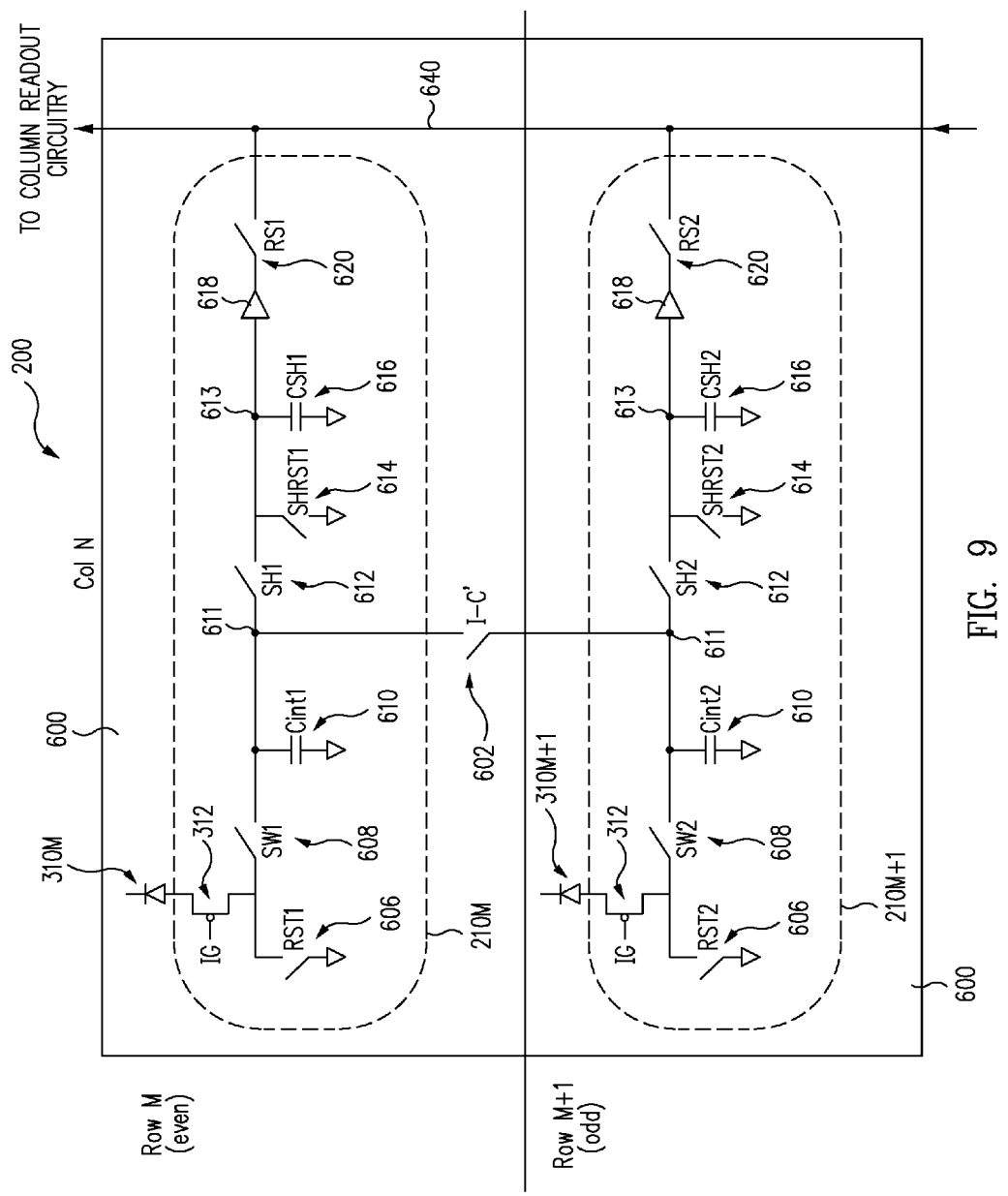
FIG. 9 illustrates a circuit diagram of dual-mode circuitry associated with the unit cell of FIG. 3 in accordance with another embodiment of the disclosure.
Figure 10:
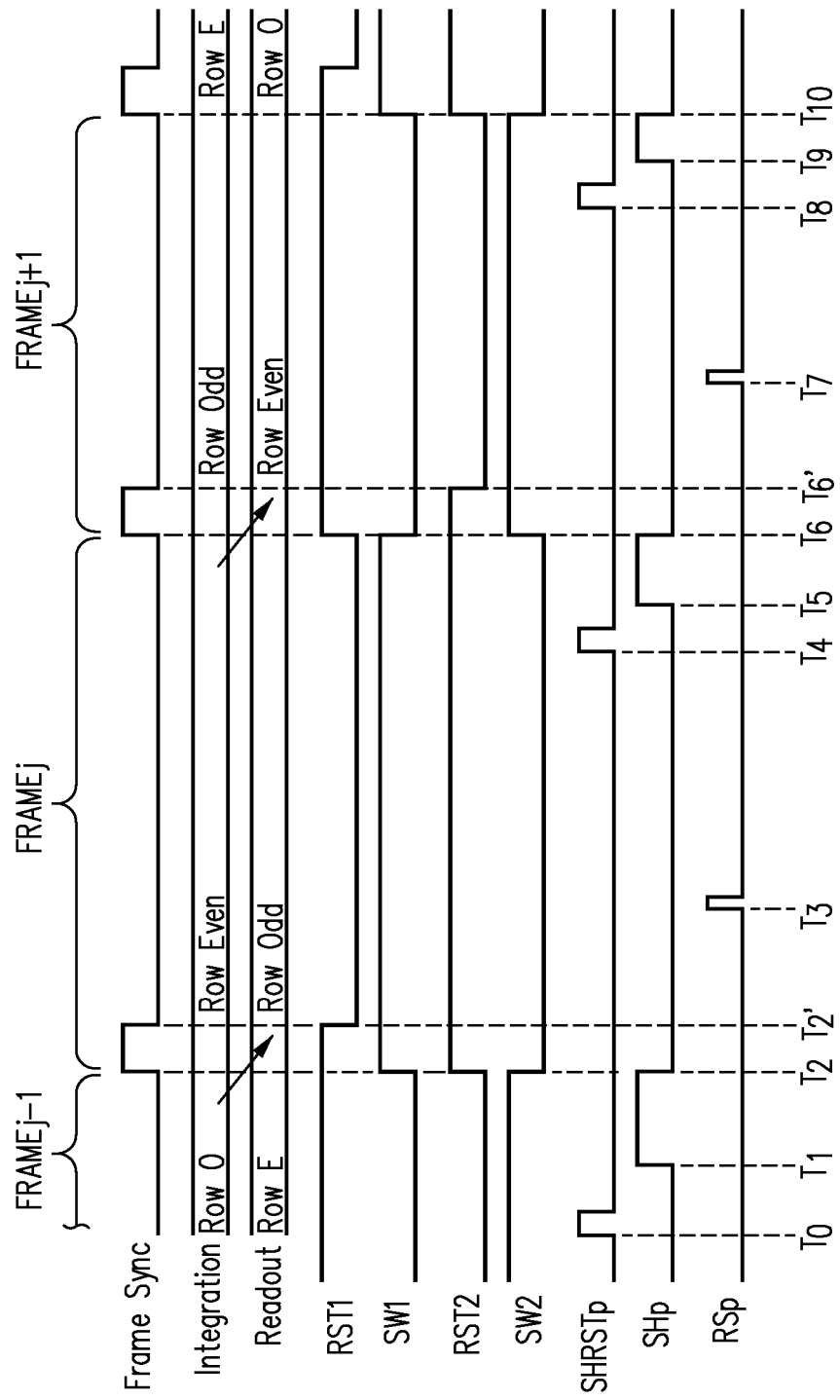
FIG. 10 illustrates a timing diagram showing the status of various control signals during a high-capacitance mode of operation of the circuitry of FIG. 9 in accordance with an embodiment of the disclosure.
Figure 12:
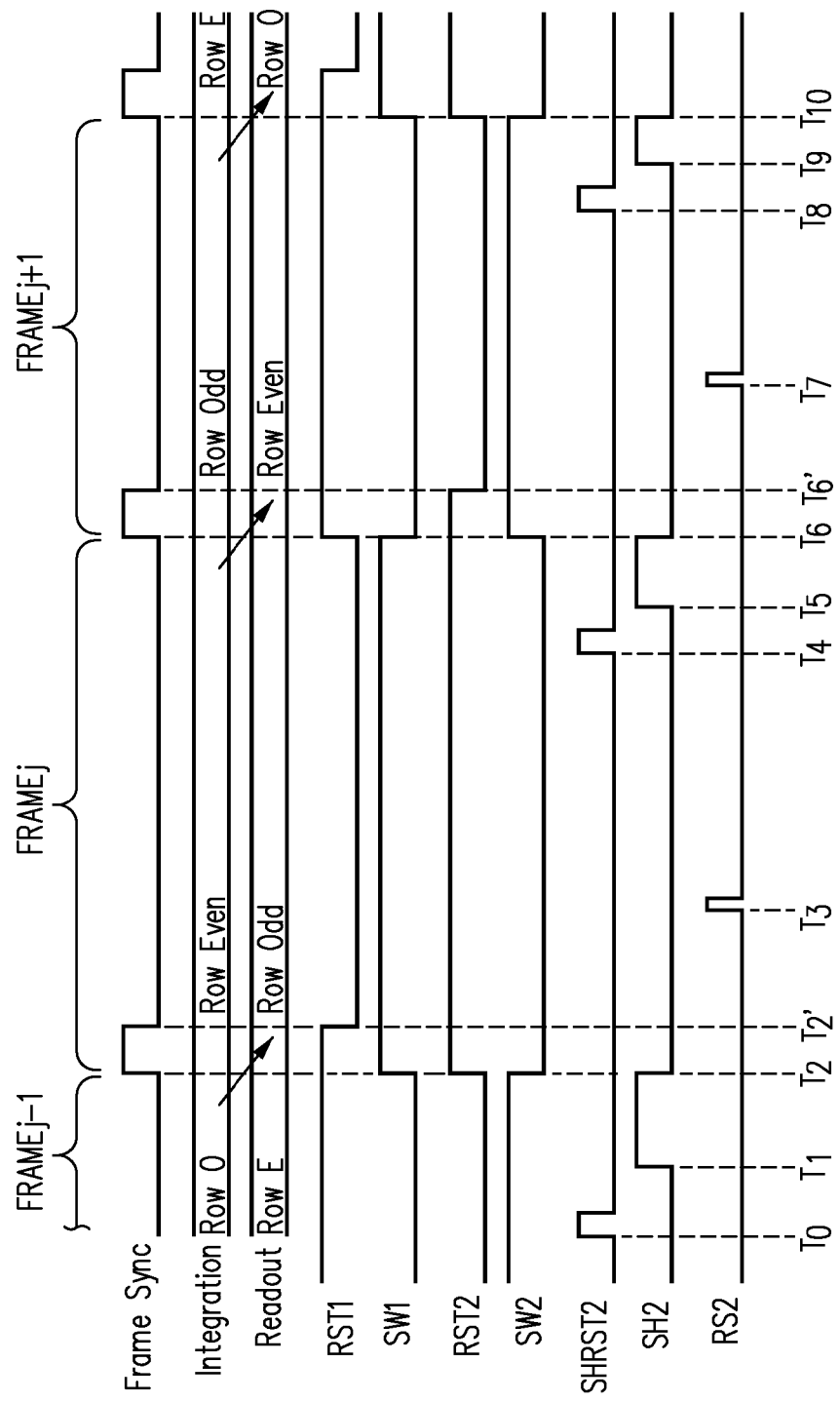
FIG. 12 illustrates a timing diagram showing the status of various control signals during operation of the circuitry of FIG. 11 in accordance with an embodiment of the disclosure.
Figure 13:
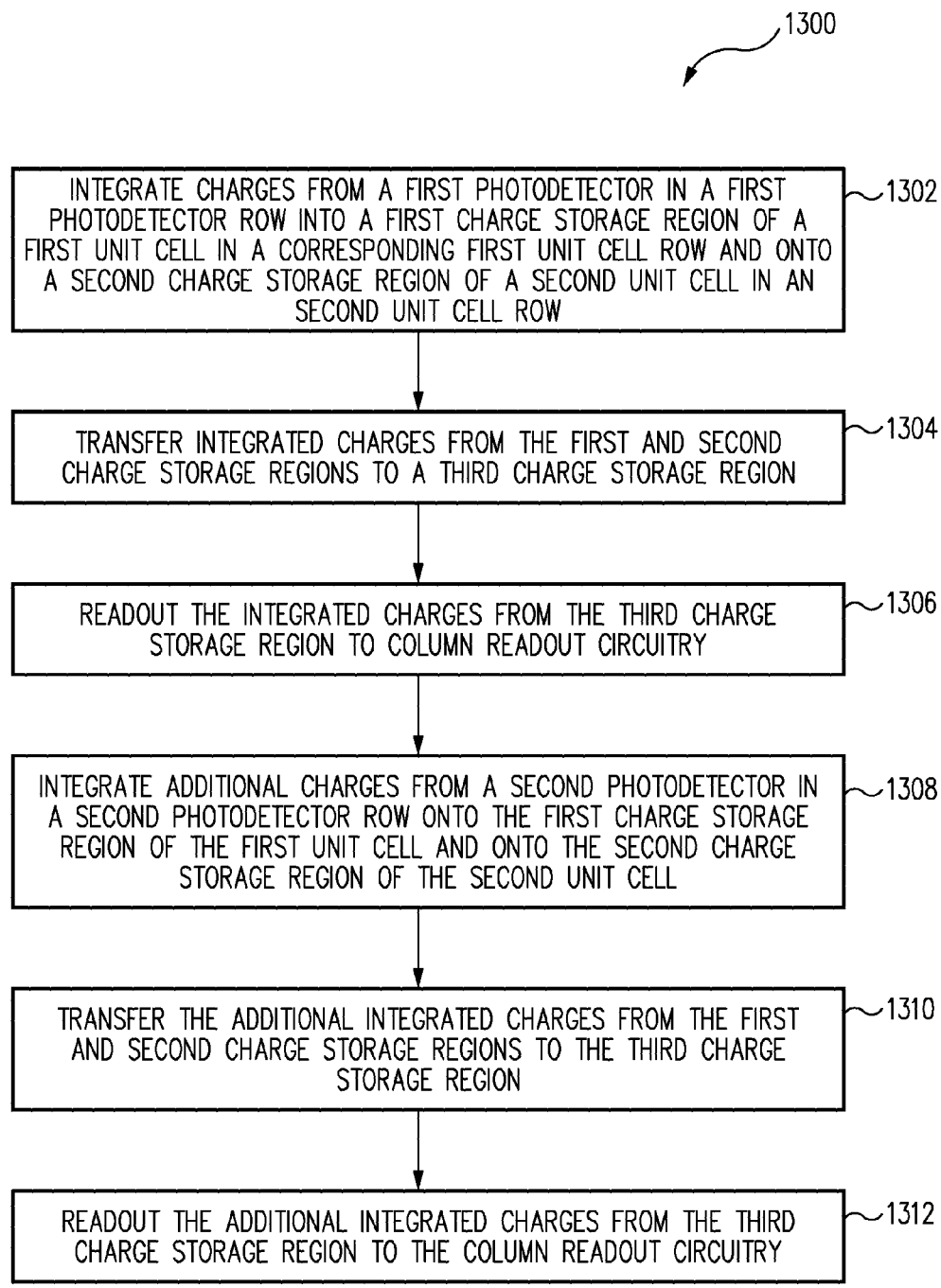
FIG. 13 illustrates a flow diagram showing how an imaging system may be operated using shared readout capacitance to capture images in an interleaved integration and readout operation in accordance with an embodiment of the disclosure.

FIG. 9 is an example of a dual-mode image sensor having unit cells that are switchably coupled together with a single increased-capacitance switch. FIG. 10 is a timing diagram showing illustrative signals that may be used to operate the dual-mode circuitry of FIG. 9 in a high-capacitance mode of operation. FIG. 11 is an example of a high-capacitance image sensor having unit cells that are permanently coupled together for high-capacitance imaging using interleaved readout. FIG. 12 is a timing diagram showing illustrative signals that may be used to operate the circuitry of FIG. 11. FIG. 13 is a flow chart of illustrative steps that may be used in capturing interleaved images in a high-capacitance imaging process using any of the circuits described herein.

Turning now to FIG. 9, as shown in FIG. 9, adjacent unit cells such as unit cells 210M and 210M+1 in respective rows M and M+1 and in column N may be switchably coupled together with I-C switch 602 coupled between capacitors 610 of cells 210M and 210M+1 without an additional switch between capacitors 616. In the configuration shown in FIG. 9, image signals generated in a normal mode of operation may be integrated and read out using the same control signals described above in connection with FIG. 7. In this configuration, in a high-capacitance mode of operation, switch 602 may be closed and integrated image signals may be read out using switches 612, 614, and 620 of one or both of unit cells 210M or 210M+1.

The operation of the circuitry of FIG. 9 in a high-capacitance mode of operation may be further understood with reference to FIG. 10 which illustrates a timing diagram of unit cells 210M and 210M+1 in accordance with an embodiment of the invention.

In FIG. 10, a control signal followed by a p indicates that that control signal is asserted and deasserted in either unit cell 210M or unit cell 210M+1. In one embodiment, p=1 and signals SHRST1, SH1, and RS1 are operated as shown in FIG. 10. In this embodiment, signal SH2 and signal RS2 are always held at a logic low value and signal SHRST2 is always held at a logic high value. In another embodiment, p=2 and signals SHRST2, SH2, and RS2 are operated as shown in FIG. 10. In this embodiment, signal SH1 and signal RS1 are always held at a logic low value and signal SHRST1 is always held at a logic high value. In another embodiment, p=1 and 2 so that the control signals for SHRST1 and SHRST2 are tied together, SH1 and SH2 are tied together and RS1 and RS2 are tied together.

In the example of FIG. 10, increased-capacitance signal I-C' of FIG. 9 (not shown in FIG. 10) is held high throughout in order to close switch 602.

As shown in FIG. 10, in the high-capacitance mode of operation using the circuitry of FIG. 9, control signals SHRSTp and SHp may be pulsed at respective times T0 and T1 in order to prepare image signals from, for example, an odd-numbered detector row (referred to as ROW O or ROW Odd in FIG. 10) for an j−1th frame for readout through the unit cell corresponding to the selected value of p (e.g., p=1, or p=2, or p=1 and 2) during integration of image signals from, for example even-numbered detector rows for a jth frame.

For a jth frame, at a time T2, a frame sync single may be asserted, switch control signal SW1 and reset control signal RST2 may transition to a logic high value, and switch signal SW2 may be deasserted (transition to a logic low value) in order to close switch 608 of cell 210M, open switch 608 of cell 210M+1, and sink current from detector 310M+1 in order to avoid signal leakage from detector 310M+1 during integration of row M. At time T2, reset control signal RST1 may still have a logic high value from operations associated with frame j−1. At a time T2', the frame sync signal and reset signal RST1 may be deasserted to begin integration of charge from detector 310M onto capacitors 610 of both unit cells 210M and 210M+1. During an integration time for frame j (from time T2' to time T5), a row-select signal RSp (i.e., row-select signal RS1, or row-select signal RS2, or both RS1 and RS2) may be pulsed at a time T3 in order to read out an image signal associated with frame j−1 from nodes 613 of either or both unit cells 210M and 210M+1.

During the integration period for the jth frame, at a time T4, sample-hold-reset signal SHRSTp may be pulsed to reset one or both of capacitors 616. If desired, a reset voltage may be read out from one of nodes 613 by pulsing (not shown) the row-select signal for one or both rows.

Near the end of the integration period for the jth frame, at a time T5, the transfer control signal SHp may be pulsed to transfer the integrated signals generated by detector 310M from nodes 611 to nodes 613 to be stored using capacitors 616.

The transferred signals at nodes 613 may then be read out during a subsequent readout time (from time T6 through time T8) for a j+1th frame, by pulsing RSp at a time T7.

The j+1th frame begins when, at time T6, a frame sync single is asserted, switch control signal SW1 is deasserted and reset control signal RST1 and switch signal SW2 are asserted high, in order to open switch 608 of cell 210M, close switch 608 of cell 210M+1, and sink current from detector 310M in order to avoid signal leakage from detector 310M during integration of row M+1. At time T6, reset control signal RST2 may still have a logic high value from operations associated with frame j. At a time T6', the frame sync signal and reset signal RST2 may be deasserted to begin integration of charge from detector 310M+1 onto capacitors 610 of both unit cells 210M and 210M+1. During the integration time for frame j+1, a row-select signal RSp (i.e., row-select signal RS1, or row-select signal RS2, or both RS1 and RS2) may be pulsed in order to read out the image signals integrated for frame j from nodes 613 of either or both unit cells 210M and 210M+1.

Signals for the j+1th frame may then be transferred to one or both of nodes 613 that has been reset by pulsing SHRSTp and SHp at respective times T8 and T9.

Subsequent frames such as an additional even row (Row E or Row EVEN) frame, may then be captured using a repeat of the signals for frames j and j+1 beginning at time T10.

Figure 11:
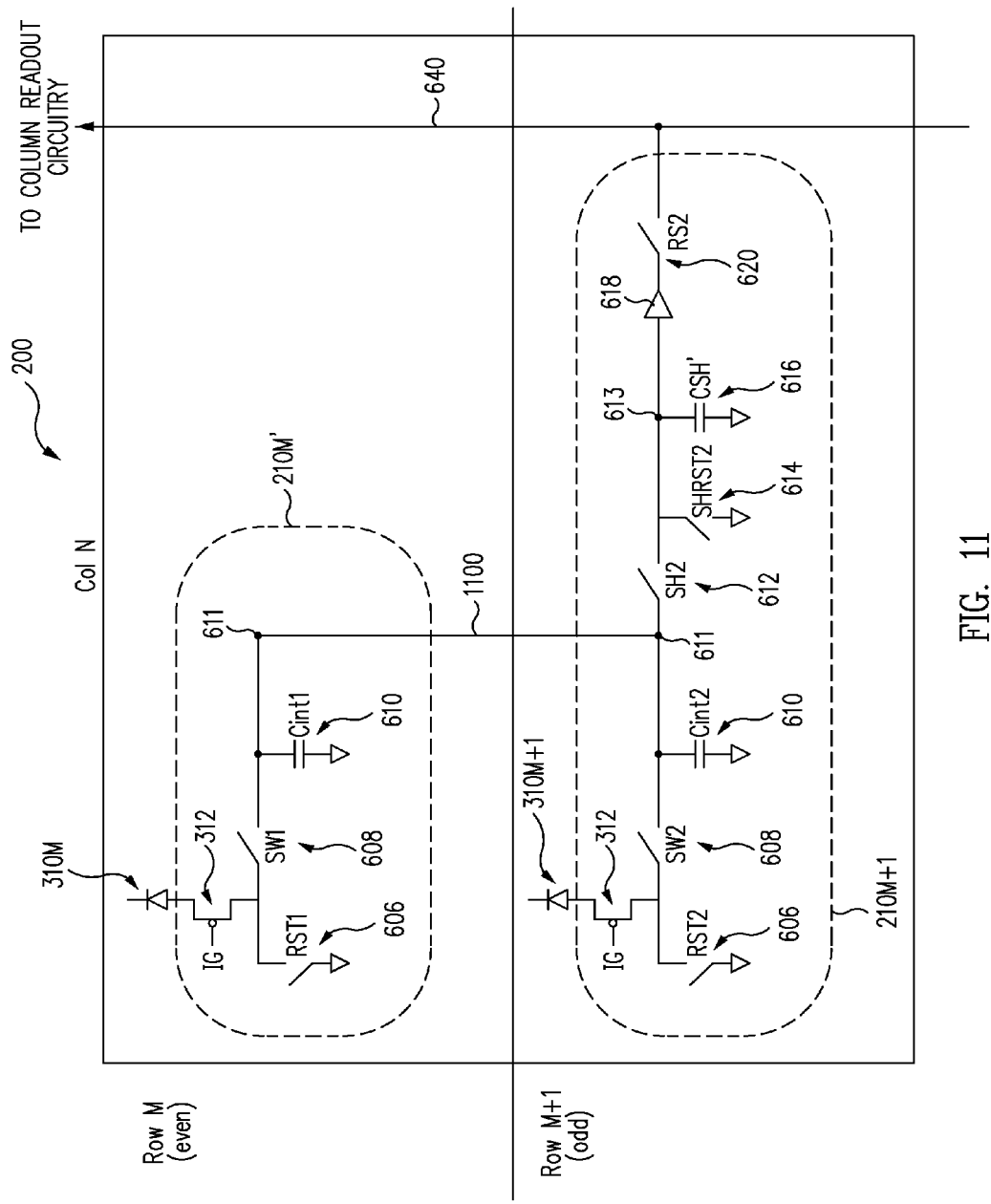
FIG. 11 illustrates a circuit diagram of a high-capacitance image sensor associated with the unit cell of FIG. 3 in accordance with an embodiment of the disclosure.

Turning now to FIG. 11, as shown in FIG. 11, adjacent unit cells such as unit cells 210M' and 210M+1 in respective rows M and M+1 and in column N may be permanently coupled together by a communications path such as path 1100 that is free of any switches.

In the configuration shown in FIG. 11, image signals may be generated using high-capacitance image capture and readout operations in which image signals generated by detectors 310M and 310M+1 are always integrated using shared capacitors 610 of unit cells 210M' and 210M+1.

As shown in FIG. 11, unit cells of some rows (e.g., unit cells in row M or other even-numbered rows) may be provided without a transfer switch, a sample-hold-reset switch, a sample node, a buffer or a row-select switch. In this configuration, these image signal capture and readout components are shared between rows M and M+1 so that unit cell M and unit cell M+1 form a super unit cell that is 1 column wide and 2 rows high. In this type of configuration, space may be provided within this super unit cell for increasing the size (and thereby the capacitance CSH') of capacitor 616. The extra space in this super unit cell may also allow for a relative increase in size of Cint1 and Cint2 (capacitors 610) within the super unit cell formed by the combination of unit cells 210M and 210M+1.

In some embodiments, a super unit cell of this type may be formed having any element of unit cell 210M and 210M+1 located at any suitable location within the super unit cell. For example, one or more of components such as switches 614 and 620 and/or some or all of capacitor 616 may be formed within rows M and/or M+1.

The operation of the circuitry of FIG. 11 may be further understood with reference to FIG. 12 which illustrates a timing diagram of unit cells 210M' and 210M+1 in accordance with an embodiment of the invention.

As shown in FIG. 12, using the circuitry of FIG. 11, control signals SHRST2 and SH2 may be pulsed at respective times T0 and T1 in order to prepare image signals from, for example, an odd-numbered detector row (referred to as ROW O or ROW Odd in FIG. 12) for an j−1th frame for readout through unit cell 210M+1.

For a jth frame, at a time T2, a frame sync single may be asserted, switch control signal SW1 and reset control signal RST2 may transition to a logic high value, and switch signal SW2 may be deasserted (transition to a logic low value) in order to close switch 608 of cell 210M', open switch 608 of cell 210M+1, and sink current from detector 310M+1 in order to avoid signal leakage from detector 310M+1 during integration of row M. At time T2, reset control signal RST1 may still have a logic high value from operations associated with frame j−1. At a time T2', the frame sync signal and reset signal RST1 may be deasserted to begin integration of charge from detector 310 onto capacitors 610 of both unit cells 210M' and 210M+1. During the readout time for frame j (from time T2 to time T4), a row-select signal RS2 may be pulsed at a time T3 in order to read out an image signal associated with frame j−1 from node 613 of unit cell 210M+1.

During the integration period for the jth frame, at a time T4, sample-hold-reset signal SHRST2 may be pulsed to reset capacitor 616 of cell 210M+1. If desired, a reset voltage may be read out from node 613 by pulsing (not shown) the row-select signal RS2.

Near the end of the integration period for the jth frame, at a time T5, the transfer control signal SH2 may be pulsed to transfer the integrated signals generated by detector 310M from nodes 611 of unit cells 210M' and 210M+1 to node 613 of unit cell 210M+1 to be stored using capacitor 616 of unit cell 210M+1. The image signals generated by detector 310M may thereby be readout through its associated unit cell 210M' and through unit cell 210M+1.

The transferred signal at node 613 may then be read out during a subsequent readout time (from time T6 through time T8) for a j+1th frame, by pulsing RS2 at a time T7.

The j+1th frame begins when, at time T6, a frame sync single is asserted, switch control signal SW1 is deasserted and reset control signal RST1 and switch signal SW2 are asserted high, in order to open switch 608 of cell 210M', close switch 608 of cell 210M+1, and sink current from detector 310M in order to avoid signal leakage from detector 310M during integration of row M+1. At time T6, reset control signal RST2 may still have a logic high value from operations associated with frame j. At a time T6', the frame sync signal and reset signal RST2 may be deasserted to begin integration of charge from detector 310M+1 onto capacitors 610 of both unit cells 210M' and 210M+1. During the readout time for frame j+1, a row-select signal RS2 may be pulsed in order to read out the image signals integrated for frame j from node 613 of unit cell 210M+1.

Signals for the j+1th frame may then be transferred to one of nodes 613 that has been reset by pulsing SHRST2 and SH2 at respective times T8 and T9.

Subsequent frames such as an additional even row (Row E or Row EVEN) frame, may then be captured using a repeat of the signals for frames j and j+1 beginning at time T10.

It should be appreciated by one skilled in the art that the examples described above in which the interleaved integration and readout operations are performed for alternating even and odd rows is merely illustrative and that shared capacitance between pixels may be extended to any desired configuration such as alternating pair of rows, alternating triplets of rows, other row-based configurations, or other non-row based configurations.

Turning now to FIG. 13, FIG. 13 illustrates a flowchart of a process 1300 for capturing images using a high-capacitance image sensor (e.g., a high-capacitance image sensor or a dual-mode image sensor with a high-capacitance mode of operation) by capturing interleaved images in accordance with an embodiment of the disclosure. In some embodiments, process 1300 may be implemented as an embodiment of block 410 in process 400 of FIG. 4, for example, to capture interleaved images in a high-capacitance mode of operation.

It should also be appreciated that any step, sub-step, sub-process, or block of process 1300 may be performed in an order or arrangement different from the embodiment illustrated by FIG. 13. In some embodiments, any portion of process 1300 may be implemented in a loop so as to continuously operate on a series of infrared and/or visible spectrum images, such as a video of a scene. In other embodiments, process 1300 may be implemented in a partial feedback loop including display of intermediary processing (e.g., after or while receiving infrared and/or visible spectrum images, performing preprocessing operations, generating combined images, performing post processing operations, or performing other processing of process 1300) to a user, for example, and/or including receiving user input, such as user input directed to any intermediary processing step.

At block 1302, charges such as first charges from a first photodetector in a first photodetector row may be integrated onto a first charge storage region of a first unit cell in a corresponding first unit cell row and onto a second charge storage region of a second unit cell in a second unit cell row. The second charge storage region may have its own, second photodetector in a second photodetector row that is decoupled from the second charge storage region during integration of charges from the first photodetector. The first and second unit cells may be located in a common unit cell column that is coupled to a column readout line and additional column readout circuitry for that unit cell column.

At block 1304, the integrated first charges on the first and second charge storage regions may be transferred onto at least a third charge storage region. The third charge storage region may be a single charge storage region located in the first or second unit cell row or may be a combined storage region formed from storage regions in both the first and second unit cell rows.

At block 1306, an image signal such as an image signal voltage corresponding to the integrated first charges that are stored on the third charge storage region may be read out from the third charge storage region to column readout circuitry.

At block 1308, additional charges such as second charges from the second photodetector in the second photodetector row may be integrated onto the first charge storage region of the first unit cell and onto the second charge storage region of the second unit cell in the second unit cell row. The first photodetector in the first photodetector row may be decoupled from the first and second charge storage regions during integration of the second charges from the second photodetector. In some embodiments, the operations described in connection with blocks 1306 and 1308 may be performed in parallel so that the integrated first charges from the third charge storage region are read out while the second charges from the second photodetector in the second photodetector row are integrated onto the first charge storage region of the first unit cell and onto the second charge storage region of the second unit cell in the second unit cell row At block 1310, the integrated second charges on the first and second charge storage regions may be transferred onto at least the third charge storage region. The third charge storage region may be reset (e.g., to a reset voltage) between the readout of the integrated charges at block 1308 and the transfer of the additional charges at block 1310.

At block 1312, an additional image signal such as an additional image signal voltage corresponding to the integrated second charges that are stored on the third charge storage region may be read out from the third charge storage region to the column readout circuitry. In this way, image signals from detectors in the first detector row and image signals from detectors in the second detector row can be generated and read out in an interleaved manner that allows the charge storage regions in multiple unit cell rows to be shared for each detector, thereby increasing the capacitance of the readout circuitry for each detector. The processes described above in connection with process 1300 can be repeated for all detector rows (and corresponding unit cell rows) for reading out interleaved image frames.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A dual-mode image sensor having a normal mode of operation and a high-capacitance mode of operation, comprising:
    an array of image detectors arranged in detector rows and detector columns;
    a corresponding array of unit cells arranged in corresponding unit cell rows and unit cell columns, wherein each unit cell is associated with a particular one of the image detectors and wherein each unit cell includes a charge storage region for integrating charges generated by at least one of the image detectors; and
    a plurality of switches, wherein each switch is coupled between the charge storage regions of two of the unit cells and wherein the plurality of switches are operable to switch the dual-mode image sensor between the normal mode of operation and the high-capacitance mode of operation.

2. The dual-mode image sensor of claim 1, wherein, in the high-capacitance mode of operation, the plurality of switches are closed switches.

3. The dual-mode image sensor of claim 1, wherein, in the normal mode of operation, the plurality of switches are open switches.

4. The dual-mode image sensor of claim 1, wherein each unit cell further includes a switch coupled between the charge storage region of that unit cell and the particular one of the image detectors that is associated with that unit cell.

5. The dual-mode image sensor of claim 4, wherein, in the normal mode of operation, the switch of each of the unit cells is a closed switch.

6. The dual-mode image sensor of claim 4, wherein, in the high-capacitance mode of operation, the switches of unit cells in adjacent unit cell rows are configured to be alternatingly opened and closed.

7. The dual-mode image sensor of claim 4, wherein at least some of the unit cells further include:
    an additional charge storage region;
    a transfer switch coupled between the charge storage region of that unit cell and the additional charge storage region; and
    a row-select switch, wherein the transfer switch and the row-select switch in a given unit cell are operable to read out an image signal based on integrated charges on the charge storage region of at least that unit cell to column readout circuitry.

8. The dual-mode image sensor of claim 1, wherein each unit cell includes an additional charge storage region, the dual-mode image sensor further comprising a plurality of additional switches, wherein each additional switch is coupled between the additional charge storage regions of two of the unit cells.

9. The dual-mode image sensor of claim 1, wherein at least some of the image detectors are infrared image detectors.

10. A high-capacitance image sensor, comprising:
    an array of image detectors arranged in detector rows and detector columns;
    a corresponding array of unit cells arranged in corresponding unit cell rows and unit cell columns, wherein each unit cell is associated with a particular one of the image detectors and wherein each unit cell includes a separate corresponding capacitor in each unit cell configured to integrate charges generated by at least two of the image detectors; and
    a plurality of switches interposed between the unit cells to selectively couple and decouple the unit cells to switch between a high-capacitance mode of operation and a normal mode of operation.

11. The high-capacitance image sensor of claim 10, wherein the capacitors of the unit cells in each unit cell row are configured to alternately integrate charges from image detectors in at least a first detector row and a second detector row.

12. The high-capacitance image sensor of claim 11, wherein each unit cell includes a switch coupled between the capacitor of that unit cell and the particular one of the image detectors that is associated with that unit cell.

13. The high-capacitance image sensor of claim 12, wherein each unit cell in a first unit cell row forms, in combination with a corresponding one of the unit cells in a second unit cell row, a super unit cell.

14. The high-capacitance image sensor of claim 13, wherein each super unit cell includes an additional capacitor configured to receive charges from the capacitors the unit cells in the first unit cell row and the second unit cell row that form that super unit cell.

15. The high-capacitance image sensor of claim 10, wherein each of the image detectors comprises an infrared detector.

16. A method of operating an image sensor having an array of photodetectors arranged in photodetector rows and photodetector columns and a corresponding array of unit cells arranged in corresponding unit cell rows and unit cell columns, the method comprising:
    integrating a first image signal from a first photodetector located in a first photodetector row using a first unit cell in an associated unit cell row and using a second unit cell in an additional unit cell row;
    reading out the first integrated image signal from the first and second unit cells to column readout circuitry;
    integrating a second image signal from a second photodetector located in a second photodetector row using the first unit cell and the second unit cell; and
    reading out the second integrated image signal from the first and second unit cells to the column readout circuitry.

17. The method of claim 16, wherein the photodetectors comprise infrared image detectors and wherein the integrating the first image signal from the first photodetector located in the first photodetector row using the first unit cell in the associated unit cell row and using the second unit cell in the additional unit cell row comprises accumulating first charges generated by a first infrared image detector using a first charge storage region in the first unit cell and a second charge storage region in the second unit cell.

18. The method defined in claim 17, wherein the integrating the second image signal from the second photodetector located in the second photodetector row using the first unit cell and the second unit cell comprises accumulating second charges generated by a second infrared image detector using the first charge storage region and the second charge storage region.

19. The method of claim 18, further comprising, before the accumulating the second charges generated by the second infrared image detector, transferring the accumulated first charges generated by the first infrared image detector from the first and second charge storage regions to at least a third charge storage region in the second unit cell.

20. The method of claim 19, further comprising transferring the accumulated second charges generated by the second infrared image detector from the first and second charge storage regions to at least the third charge storage region in the second unit cell.

* * * * *